United States Patent [19]

Jensen

[11] Patent Number: 5,718,543
[45] Date of Patent: Feb. 17, 1998

[54] METHOD AND APPARATUS FOR PROCESSING A SIDE BEARING COMPONENT FOR RAILROAD CARS

[75] Inventor: Erik D. Jensen, Batavia, Ill.

[73] Assignee: Miner Enterprises, Inc., Geneva, Ill.

[21] Appl. No.: 578,413

[22] Filed: Dec. 26, 1995

[51] Int. Cl.$^6$ .................................................. B23B 39/22
[52] U.S. Cl. ........................ 408/37; 408/95; 29/33 R
[58] Field of Search ............................ 408/37, 39, 51, 408/53, 95, 98, 103; 105/199.3; 29/33 R

[56] References Cited

U.S. PATENT DOCUMENTS

| | | | |
|---|---|---|---|
| 1,848,915 | 3/1932 | Trosch | 408/37 |
| 2,302,878 | 11/1942 | Muhl et al. | 29/33 R |
| 3,712,691 | 1/1973 | Cope | 308/138 |
| 4,215,958 | 8/1980 | Jägers | 408/51 |
| 4,712,487 | 12/1987 | Carlson | 105/199.3 |

*Primary Examiner*—Larry I. Schwartz
*Assistant Examiner*—Marc W. Butler

[57] ABSTRACT

The present invention relates to an apparatus for consistently machining a side bearing component for railroad cars such that the components produced all have similar performance characteristics. The preferred method of the present invention includes the steps of: arranging a rectangular shaped spring member within a fixture such that a top surface of the spring member is disposed in a predetermined position relative to a centerline of a rotating tool capable of making a bore of predetermined diameter in said spring member; moving first and second arms along a predetermined path of movement inwardly toward and into contact with opposite sides of the spring member to sideways position the spring member in a predetermined relation relative to the centerline of the tool; holding the spring member in place under a predetermined and constant pressure after the spring member is positioned relative to the tool; and moving at least one of the fixture and the tool along a predetermined path of travel such that the bore is provided in a predetermined location on the spring member to provide the spring member with predetermined performance characteristics.

3 Claims, 3 Drawing Sheets

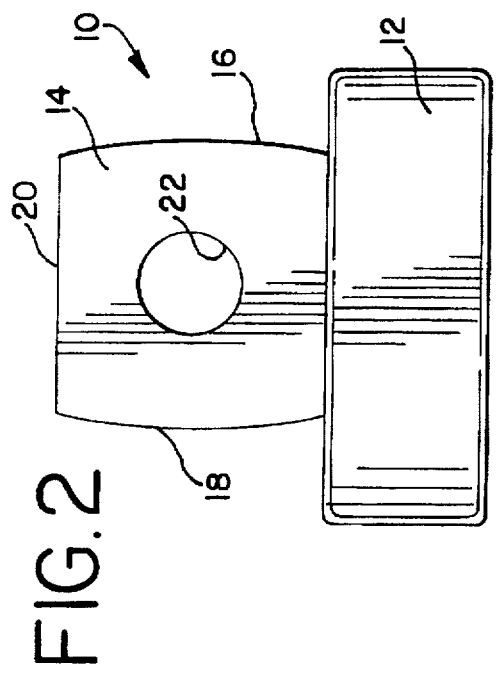
FIG.1
FIG.2
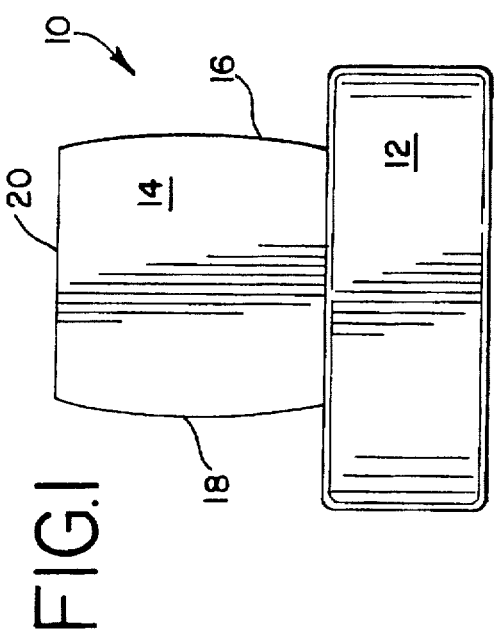
FIG.6

METHOD AND APPARATUS FOR PROCESSING A SIDE BEARING COMPONENT FOR RAILROAD CARS

FIELD OF THE INVENTION

The present invention generally relates to railroad cars and more particularly, to an apparatus for accomplishing the process with precise accuracy such that all side bearing spring assembly components produced under this method have the same performance characteristics.

BACKGROUND OF THE INVENTION

Side bearing assemblies for railroad cars include a spring assembly preferably comprising a metal top having an elastomeric spring vertically extending from a major surface thereof. The elastomeric spring preferably has a block-like or generally rectangular configuration that slidably fits within a housing with the metal top or mount extending beyond the housing. The metal top or mount interfaces with the railroad car body wear plate. More specifically, the metal mount or top isolates the elastomeric spring from abrasive wear and shear loads, while providing a stable coefficient of friction. The results are reduced track hunting and less wear on components for longer performance life.

Different methods have been proposed for securing the spring member to the metal mount. In a most preferred form, the elastomeric member is secured to the metal mount under relatively high pressure such that a portion of the elastomeric member is fixedly captured by the mount. The pressures applied to the elastomeric member may differ depending upon the force required to fixedly secure the elastomeric member within the mount. The elastomeric member and mount are then subjected to a further treating process. The elastomeric member used as part of the spring assembly preferably has a ratio of plastic strain to elastic strain that is greater than 1.5 to 1. Moreover, alter the elastomeric member is secured to the mount, a predetermined size hole or bore is provided in the elastomeric member. Providing a bore through the elastomeric spring, relives stresses and strains inherent incurred when the spring is compressed.

A severe and serious problem has developed during manufacturing of the spring assemblies for railroad car side bearings. As a result of the pressure mounting and subsequent treating process, each block or elastomeric member secured to the metal mount has a different shape. That is, one block of elastomeric material may vertically extend generally perpendicular to the mount. On the other hand, and although them was no significant difference in the process for securing the elastomeric spring to the mount, other elastomeric blocks or spring members may be vertically slanted to the left or right.

It is known, based upon experimentation and experience, that in order for the spring assembly to achieve a particular and consistent spring rate, the hole drilled, bored or otherwise provided in the spring member must be positioned in the exact same location regardless of the orientation of the spring member relative to its mount. Different size holes or different locations of the hole in the elastomeric spring will yield different energy absorption spring rates. Alternatively, the elastomeric member may be processed or machined independently of the mount. In either embodiment, it is imperative that the hole or bore be consistently provided or located in the elastomeric member. The required need for the hole to be precisely located relative to different elastomeric block configurations presents significant manufacturing and quality assurance problems. Regardless of whether the hole is provided when the elastomeric spring is affixed to the mount or otherwise, when the hole or bore is provided off-center in the elastomeric spring, i.e., closer to the size than the other, the spring is weakened. Thus, when compressive loads are applied to the side bearing, the elastomeric spring tends to compress on one side more than the other. As a result, the spring assembly has a shortened life expectancy. If the hole is not centered relative to the elastomeric block, not only will the spring assembly wear out quicker, but the housing that accommodates the spring assembly will also be subject to wear as the elastomeric member is compressed off-center.

Fabrication of elastomeric spring assemblies for railcar side bearings has involved a labor intesive process. To obtain substantially consistent spring rates for the spring assemblies, it is known to measure and manually center the elastomer block relative to a centerline of a tool such as a drill. This is a lime consuming an labor intensive effort. Because of the human error factor involved, there is relatively high rejection rate of the elastomeric springs that are manually machined. As will be appreciated, high rejection also means relatively high cost to manufacture. Moreover, those springs that are incorrectly processed and inadvertently arranged in a side bearing assembly quickly fail and, thus, result in undue downtime for the railcar when replacement side bearing assemblies are required.

Thus, there, is a need and a desire for an improved method of making elastomeric and apertured spring assemblies having consistent performance characteristics. The need for an improved method likewise lends itself to a need and a desire for an apparatus capable of effecting an improved method of processing the elastomeric spring assemblies such that they have consistent performance characteristics.

SUMMARY OF THE INVENTION

In view of the above, and in accordance with the present invention, there is provided a unique method of processing an elastomeric spring member used in a side bearing assembly of a railroad car. The preferred method includes the steps of: arranging a rectangular shaped spring member within a fixture such that a top surface of the spring member is disposed in predetermined position relative to a centerline of a rotating tool capable of machining a bore of predetermined diameter in the spring member; moving first and second arms along a predetermined path of movement inwardly toward and into contact with opposing sides of the spring member to position the spring member in a predetermined relation relative to the centerline of the tool; holding the spring member in place under a predetermined and constant pressure after the spring member is positioned relative to the tool; and moving at least one of said fixture and said tool along a predetermined path of travel such that said bore is provided in said predetermined location on said spring member to provide said spring member with predetermined performance characteristics.

In a preferred form of the invention, the spring member is secured to a mount to form a spring assembly. In this form of the invention, the spring assembly is initially arranged within the fixture such that when the first and second arms are moved, the spring member and mount move as an assembly relative to the longitudinal centerline of the tool. In this embodiment of the invention, and after the spring member is affixed to the mount, the top surface of the spring member is disposed in predetermined relation relative to the centerline of the tool.

Another aspect of the present invention involves working on the spring member independent of its mount. That is, the spring member can be releasably positioned in a apparatus such that the top surface of the spring member is disposed in predetermined relation relative to the tool. After the hole or bore is machined into the spring member, the spring member is released from the mount. Another step involves fixedly securing the apertured spring member in a mount independent of the process of providing a hole or bore within the spring member.

The holding step involves moving a holding member into contact with the spring assembly to prevent the spring member from moving or tipping after it is positioned relative to the tool. In a most preferred form of the invention, the holding member moves into contact with and presses with a predetermined force against a top surface of the spring member.

In a preferred form of the present invention, the step of moving the first and second arms involves moving the arms inwardly an equal distance relative to each other to position the spring member relative to the tool. According to one aspect of the present invention, a common power source conjointly moves the arms into contact with the spring member.

In a most preferred form of the invention, the process of the present invention automatically centers the spring member relative to the centerline of the tool. Because the arms move simultaneously inward, they serve to center the spring member relative to the centerline of the tool regardless of the deformation of the spring member. Thus, the heretofore known problems with deformation of the spring member as it is attached or affixed to the mount are eliminated.

Another aspect of the present invention relates to an apparatus for processing such an elastomeric spring assembly. The apparatus according to the present invention includes a first rotatable tool defining an elongated axis, and a work station whereat the elastomeric spring assembly is releasably received. The work station is arranged in predetermined relation relative to the centerline of the tool and includes first and second arms movable along a predetermined path of movement inwardly and into contact with opposite sides of the spring member to position the spring assembly in predetermined relation relative to the tool. The spring assembly is held in the work station under a predetermined and constant compressive force after the spring assembly is positioned relative to the tool. Thereafter, a bore or hole is machined in a predetermined location in the spring member by the tool thereby providing said spring assembly with a predetermined and consistent performance characteristics after the bore is provided therein.

In a preferred form of the invention, the tool of the above described apparatus is a drill of a predetermined diameter. In a most preferred form of the invention, the work station moves relative to the drill and the drill is arranged for non-linear movement. That is, according to one embodiment of the invention, the work station moves from a loading position, removed from the area of the drill to facilitate loading and unloading of the spring assembly into the work station, toward the drill thereby providing the bore or hole in the spring member.

In accordance with a preferred form of the present invention, the first and second arms on the work station are positioned relative to the elongated axis of the tool and are conjointly driven inwardly such that the spring member of the spring assembly is centered relative to the tool regardless of the deformation associated with the spring member. The apparatus of the present invention, preferably utilizes a common power source for moving both arms.

Besides eliminating human operator error, the arms of the powered apparatus may be configured or positioned to locate the spring member as desired relative to the centerline of the tool thereby effecting whatever spring characteristics may be desired with consistency. As will be appreciated, and to enhance production output, the apparatus of the present invention can include a plurality of work stations that combine with a plurality of a number of rotating tools such that more than one spring member can be processed at a time. Preferably, at least two drills are arranged in axial alignment relative to each other thereby allowing a first work station to move one spring member into contact with one drill, while a spring member on an opposite side of the one spring member can be arranged within a second work station such that the second work station can subsequently traverse into contact with the other drill without incurring time loss during the production procedure. The production advantages of adding additional work stations to the apparatus are readily apparent.

Numerous other objects, aims and advantages of the present invention will become readily apparent from the following detailed description, the accompanying drawings, and the appended claims.

DETAILED DESCRIPTION OF THE DRAWINGS

FIG. 1 is an elevational view of an elastomeric spring assembly prior to a hole being formed therein;

FIG. 2 is an elevational view similar to FIG. 1 with a hole being provided in a spring member of the spring assembly;

FIG. 6 is a partial top plan view of an apparatus embodying principals of the present invention.

DETAILED DESCRIPTION OF THE PRESENT INVENTION

Figure 3:
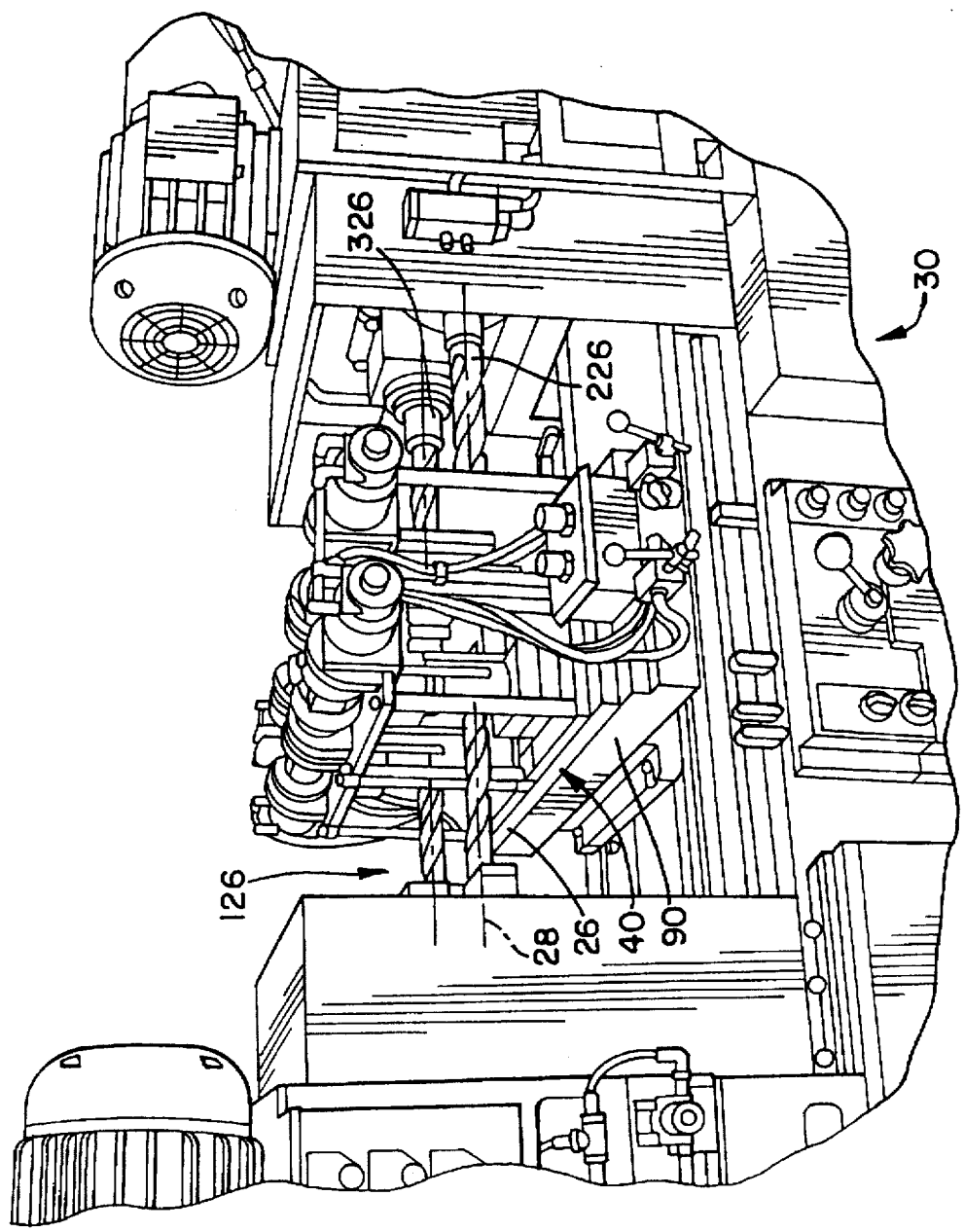
FIG. 3 is a perspective view of an apparatus embodying principals of the present invention.

While the present invention is susceptible of embodiment in various forms, there is shown in the drawings a preferred embodiment of the invention which is hereinafter described, with the understanding that the disclosure which is presented is to be considered an exemplification of the present invention and is not intended to limit, the invention to the specific embodiment illustrated.

Referring now to the drawings, wherein like reference numerals refer to like parts throughout the several views, there is shown in FIG. 1 an elastomeric spring assembly or unit 10. The elastomeric spring assembly is comprised of a metal mount or top 12 having a preformed elastomeric spring member 14 affixed thereto and extending away therefrom. Preferably, the spring member 14 is affixed to the metal mount or top 12 under pressure such that a portion of the elastomeric spring member 14 is fixedly captured by the mount 12 in a manner well known in the art of manufacturing side bearing assemblies.

The preformed elastomeric spring member 14 has a generally rectangular configuration that includes opposed sides 16 and 18 and a top 20. As is well known in the art, after the elastomeric spring member 14 is affixed to the mount 12, under pressure, the sides 16 and 18 may be vertically canted relative to the mount in either direction extending to the left or right. Alternatively, after the spring member 14 is affixed to the mount 12, under pressure, the opposing sides 16 and 18 may extend generally perpendicular relative to the mount 12, as shown. Furthermore, and because of the relatively high pressures required to affix the spring member 14 to the mount 12, the sides 16 and 18 may bulge outwardly in somewhat of a convex configuration as shown.

The spring member 14 is molded from an elastomer that is very durable, inert to reaction with grime, salt and corrosive fluids, not subject to wear propagation, has tensile strength characteristics such that a ratio of plastic strain to elastic strain is greater than 1.5 to 1, and When bonded to a metal plate will far exceed the demands of even the demanding rail car industry. One such elastomer is the copolyester that is sold by E. I. DuPont de Nemoirs under the tradename Hytrel*. Such polymers are well known in the industry and are more fully described in. U.S. Pat. No. 4,198,037 to Anderson as well as U.S. Pat. Nos. 3,763,109; 3,766,146; and, 3,651,014. While the DuPont Company does provide this material under different composition numbers to reflect some minor variations in properties such as hardness, each will be suitable and a preference for any one of the compositions will be dependent upon a number of factors related to the intended or specific application. A Hytrel* type elastomer having a 4056 Shore "D" Durometer hardness or a 5556 Shore "D" Durometer hardness are preferred and have been found to be well suited. The preformed shape of the elastomeric slating member can be successfully molded by any of several techniques including melt casting injection molding, and other techniques recommended by DuPont Company and well known in the industry.

To achieve a desired spring rate, and as shown in FIG. 2, a bore or hole 22 of a particular size is provided in the spring member 14. As described above, and as will be appreciated, providing a hole or bore 22 in the spring member 14 relives stresses and strains upon compression of the spring member 14 as normally happens when the spring assembly 10 forms part of a side railcar bearing. As is well known, the particular location of the hole or bore 22 in the spring member 14 determines the particular spring rate of the spring assembly 10. Providing a different size hole in a different location will cause the spring member 14 to develop a different spring rate. Preferably, the hole or bore 20 is to be centered relative to the spring member 14.

The hole or bore 22 is provided in the spring member 14 by a tool 26 preferably in the form of a drill arranged for rotation about a fixed axis 28 defined on a machine 30 as shown in FIG. 3. The machine 30 preferably used to machine the hole 20 in the spring member 14 is a conventional and well known Excello Drill Station. That described above is commonly known in the industry.

Figure 4:
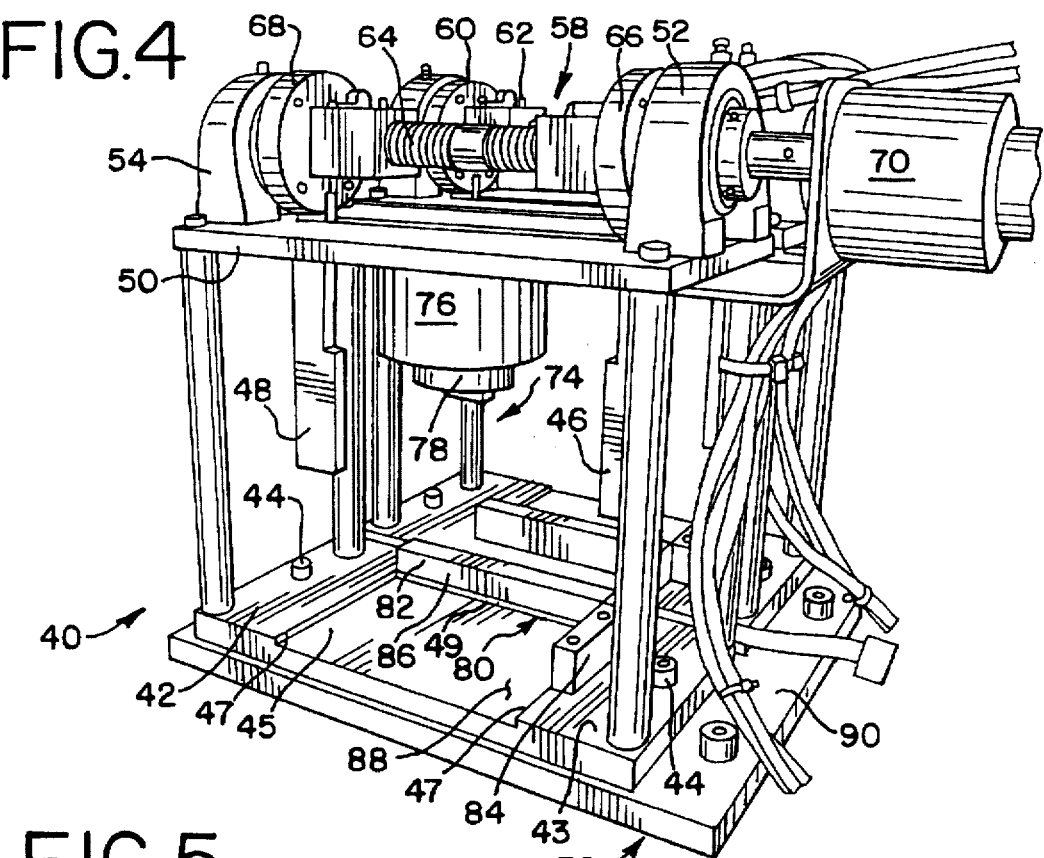
FIG. 4 is a perspective view of a work station embodying principals of the present invention shown in position to receive a spring assembly.

According to the present invention, and as, shown in FIG. 4, there is provided a fixture assembly 40 for positioning the spring member 14 (FIG. 2) relative to the tool 26 (FIG. 3) such that the bore or hole 22 is provided with consistency and accuracy regardless of the shape of the spring member 14. As shown in FIG. 4, the fixture assembly 40 defines a workstation whereat the spring assembly is releasably accommodated. As shown in FIG. 3, the workstation or fixture assembly 40 is arranged on the machine 30 in predetermined relation relative to the centerline 28 of the tool 26. Moreover, when the spring member 14 is arranged within the fixture assembly 40, the top 20 of the spring member 14 is disposed in a predetermined relation relative to the centerline 28 of tool 26.

Returning to FIG. 4, the fixture assembly 40 includes a base 42 that is releasably secured to the machine 30 as by releasable fasteners 44. As will be appreciated by those skilled in the art, the fasteners 44 permit the fixture assembly 40 to be sideways positioned into predetermined relationship relative to the centerline 28 of the tool 26 (FIG. 3). Preferably, the base 42 of fixture assembly 40 is positioned such that the tool 26 of the machine 30 will centrally locate the hole or bore 22 on the spring member 14.

Figure 5:
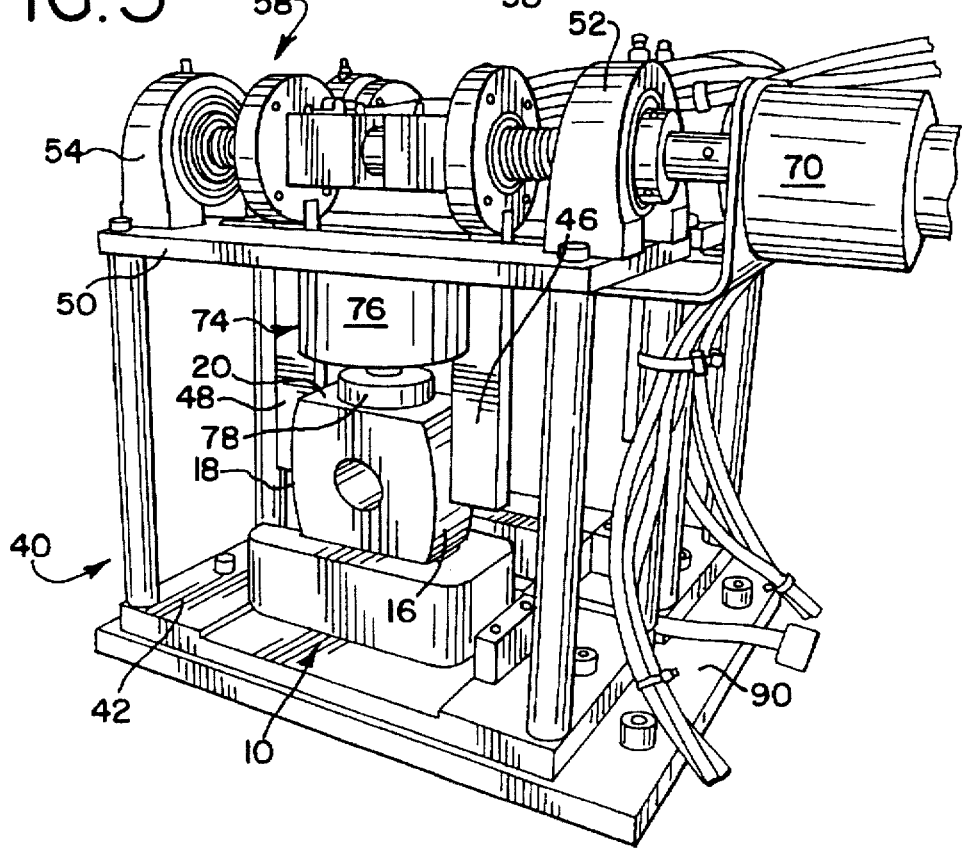
FIG. 5 is a perspective view similar to FIG. 4 but having a spring assembly mounted therein.

As shown in FIGS. 4 and 5, the fixture assembly 40 further includes first and second arms 46 and 48, respectively, that move along a predetermined path of movement inwardly toward and into contact with opposite side 16, 18, of spring member 14. In the illustrated form of the invention, the fixture assembly 40 further includes a support 50 arranged in vertically spaced relation relative to an preferably above the base 42. Support 50 has two bearing blocks 52 and 54 arranged in axially spaced relation relative to each other for supporting a drive mechanism 58. The arms 46 and 48 depend through the support 50 and are simultaneously movable through operation of the drive mechanism 58.

In the illustrated form of the invention, and as shown in FIGS. 4 and 6, drive mechanism 58 comprises a conventional twin lead ball screw mechanism that offers a cost-efficient method to perform dual opposing linear motion using one drive system. One example of such a system is that sold by Nook Industries of Cleveland Ohio under their "Power●Trac" TL line of linear actuators.

Suffice it to say, the drive mechanism includes and elongated actuator 60 rotatably supported by the bearing blocks 52 and 54. As shown, actuator 60 has left and right threaded sections 62 and 64, respectively, with movable heads 66 and 68 threadably secured about sections 62 and 64, respectively, such that each head 66, 68 has a linear travel of about 2.5 inches to about 6 inches. In a most preferred form of the invention, each head 66, 68 has a linear travel capacity of about 4.250 inches between opposite extreme ends of travel. The arms 46 and 48 are suitably secured to, depend from, and move with the heads 66, 68. A suitable motor 70 is drivingly attached to the actuator 60 and provides motive power for both movable heads 66, 68 of the drive mechanism 58. Preferably, motor 70 includes an air motor that operates at about 75 to about 100 psi. with a suitable gear reducer disposed intermediate the output of the motor 70 and the actuator 60. As will be appreciated, other forms of motors could equally be used without detracting or departing from the spirit and scope of the present invention.

Returning to FIGS. 4 and 5, the fixture assembly 40 is further provided with a mechanism 74 for releasably holding the spring member 14 in place after the arms 46 and 48 are operated to position the spring member 14 relative to the tool 26. In a preferred form of the invention, mechanism 74 comprises a linear actuator or motor 76 including a plunger 78 that moves from a retracted position into contact with the top 20 (FIG. 2) of the spring member thereby pressing the spring assembly 10 against the base 42 of the fixture assembly 40 before the tool 26 provides the bore or hole 22 in the spring member 14 thereby preventing the spring member 14 from moving or tipping during the machining process. In a most preferred form of the invention, the motor 76 comprises an air actuated cylinder that is preferably carried by the support 50 of the fixture assembly 40 with the rod end the cylinder acting as the plunger 78 for pressing against the top surface 20 of spring member 14. As will be appreciated, other forms of cylinders could equally be provided without detracting or departing from the spirit and scope of the present invention.

Preferably, and as shown in FIG. 4, fixture assembly 40 is further configured to prepositioning the spring member 14 relative to the arms 46 and 48. As shown, an apparatus 80 including a generally "L" shaped bracket 82 with arms 84 and 86 defines a cavity 88 for releasably and accommodating the mounted spring member 14. The bracket assembly 82 serves to initially position the spring member 14 relative to the arms 46 and 48 such that when the arms 46, 48 are moved they will positively engage with the opposite sides 16 and 18 of the spring member 14 thereby positioning the spring member relative to the tool 26. Alternatively, a top surface 43 of the base 42 is provided with an appropriately shaped recess 45 defining side surfaces 47 and 49 that serve to positively position the spring member 14 as by engagement with the mount 12 thereby initially positioning the spring member 14 relative to the arms 46 and 48.

In the illustrated embodiment of the invention, the fixture assembly 40 is secured to a table 90 of the machine 30. The table 90 is movable along a predetermined path of travel relative to the tool 26. As such, the table 90, along with the fixture assembly 40 carried thereby, conjointly move while the tool or drill 26 rotates but does not linearly move relative to the machine 30.

To enhance productivity and to maximize efficiency of the machine 30, a second tool 126 may be provided on the machine 30 adjacent to the tool 26. Accordingly, and as shown in FIG. 6, a second fixture assembly 140 is mounted on and movable with the table 90 in adjacent relationship relative to fixture assembly 40. Suffice it to say, fixture assembly 140 is substantially similar to fixture assembly 40. As will be appreciated, the provision of a second fixture assembly 140 allows for simultaneous production of two elastomeric spring assemblies upon one stroke of the table 90.

Moreover, it is well within the spirit and scope of the present invention to provide third and fourth tools 226 and 326 (FIG. 3) on the machine 30. The tools 226 and 326 are arranged on a side of the table 90 opposite from and extend toward tools 26 an 126. In this regard, and turning to FIG. 6, third and fourth fixture assemblies 240 and 340 would furthermore be added to the movable table 90. As will be appreciated, the fixture assemblies 240 and 340 are substantially similar to fixture assembly 40 described above.

It is also within the spirit and scope of the present invention that the spring member 14 be machined independent of its association with the mount 12. That is, the spring member is releasably supported within a support (not shown) that is positioned within the work station or fixture assembly 40 such that the top surface 20 of the spring member 14 is disposed in predetermined relationship relative to the tool 26. After the spring member 14 is arranged within the fixture assembly 40, the arms 46, 48 serve to positively position the spring member 14 relative to the centerline 28 of the tool 26 in the same manner discussed above so as to machine the hole or bore 22 in the spring member 14 with the same consistency and preciseness as heretofore discussed. After the spring member 14 is machined, the spring member 14 is removed from the work station 40 and separated from the support to promote storage thereof. As will be appreciated from the above, more than one spring member 14 can be machined at the same time if so desired and in accordance with the arrangement illustrated and described above.

Another aspect of the present invention relates to a method of making a side beating for a railroad car. The preferred method comprises the steps of affixing a rectangularly shaped spring member 14 to a mount 12 to form the spring assembly 10. The spring member 14 is preferably molded from an elastomer that is very durable and has a ratio of plastic strain to elastic strain greater than 1.5 to 1. The next step in the preferred method involves arranging the spring assembly 10 in the fixture assembly 40; moving first and second arms 46 and 48, respectively, along a predetermined path of movement inwardly toward and into contact with the opposite side surfaces 16 and 18, respectively, the spring member 14 to position the spring member 14 in a predetermined position relative to a centerline of a tool 26; holding the spring assembly 10 in place under a predetermining and constant pressure after the spring member is positioned relative to the tool; and machining a bore or hole 22 in the spring member in a predetermined location to provide the spring assembly with predetermined performance characteristics.

As mentioned above, the method of making the side beating for a railroad car involves holding the spring member 14 in place so as to allow the tool 26 to machine the bore or hole 22 therein. The holding step preferably involves moving a holding member 78 into contact with the spring member 14 to prevent it from moving relative to the tool 26 during the hole boring process. In a most preferred form of the invention, the method involves moving the fixture assembly 40 with the spring member 14 held thereto toward a rotating non-linearly movable tool.

In a preferred form of the invention, the hole or bore 22 in the spring member 14 is centrally located relative to the spring member 14. Accordingly, the method of the present invention involves moving the first and second arms inwardly an equal distance relative to each other and relative to the centerline 28 of the tool 26 to center the spring member 14 relative to the tool 26. Preferably, a common source power is provided for conjointly moving the arms 46, 48 into contact with the spring member 14.

In addition to the ability to consistently and accurately locate the bore relative to the spring member 14, the apparatus of the present invention provides still a further advantage. As will be appreciated from the above, two spring assemblies are initially positioned in two of the fixture assemblies arranged on the same side of table 90 of machine 30. As those fixture assemblies conjointly traverse into engagement with the respective tools, the operator of the machine is provided with sufficient time to load two additional spring assemblies into two additional fixture assemblies on an opposite side of the table 90 of machine 30 in a manner preparing them for movement toward the tools on the opposite side of the movable table 90. Thus, when the first two spring assemblies are machined, and are removed from the drills, the other two tool assemblies are traversed into engagement with the other drills thereby providing the operator sufficient time to unload the machined spring assemblies and reload with others.

From the foregoing, it will be observed that numerous modifications and variations can be affected without departing from the true spirit and scope of the novel concept of the present invention. It will be appreciated that the present disclosure is intended as an exemplification of the invention, and is not intended to limit the invention to this specific embodiment illustrated. The disclosure is intended to cover by the appended claims all such modifications as come within the scope of the claims.

What is claimed is:

1. An apparatus for processing an elastomeric spring assembly for a railroad car side bearing, said spring assembly comprising a mount having a generally rectangularly shaped elastomeric spring member affixedly mounted thereon, said apparatus comprising:

a first rotatable drill defining an elongated axis and centerline, sized to drill a bore of predetermined size in said elastomeric spring member and being nonlinearly movable;

a work station including a piston whereat said spring assembly is releasably received, said work station being arranged in predetermined relation relative to the centerline of said drill and includes first and second arms conjointly driven inwardly toward and into contact with opposite sides of said spring assembly to center said elastomeric spring member in predetermined relation relative to the centerline of said drill, said work station moving relative to said drill between a first position, wherein said work station is disposed a predetermined distance away from said drill such that the spring assembly can be loaded and unloaded relative to said work station, and a second position; and wherein said spring assembly is held in said work station by said piston that presses against a top surface of said spring member whereby said spring assembly is moved to said second position relative to said drill such that a bore is drilled in the spring member of the spring assembly in a predetermined position thereby providing said spring assembly with predetermined and consistent performance characteristics.

2. The apparatus according to claim 1 wherein said apparatus includes a second, third and fourth rotatable drill and second, third and fourth work stations arranged in a fixed relation to said rotatable drills for drilling out said elastomeric spring assemblies.

3. The apparatus according to claim 2 wherein said second and fourth rotatable drills are arranged in axial alignment relative to the elongated axis of said first and third drills such that as said first and third rotatable drills are operating on spring assemblies, other spring assemblies can be loaded or unloaded from the second and fourth work station.

* * * * *